(12) United States Patent
Procházka et al.

(10) Patent No.: US 12,137,150 B2
(45) Date of Patent: Nov. 5, 2024

(54) SYSTEMS AND METHODS FOR REAL-TIME REPOSITORY MANAGEMENT FOR UNIVERSAL SERVICE DEPLOYMENT

(71) Applicant: Oracle International Corporation, Redwood Shores, CA (US)

(72) Inventors: Martin Procházka, Prague (CZ); Vojtěch Janota, Prague (CZ)

(73) Assignee: Oracle International Corporation, Redwood Shores (CA)

( * ) Notice: Subject to any disclaimer, the term of this patent is extended or adjusted under 35 U.S.C. 154(b) by 0 days.

(21) Appl. No.: 17/230,670

(22) Filed: Apr. 14, 2021

(65) Prior Publication Data

US 2022/0337668 A1 Oct. 20, 2022

(51) Int. Cl.
*H04L 67/51* (2022.01)
*H04L 9/40* (2022.01)
*H04L 41/085* (2022.01)
*H04L 41/0866* (2022.01)
*H04L 67/00* (2022.01)

(52) U.S. Cl.
CPC ............ *H04L 67/51* (2022.05); *H04L 41/085* (2013.01); *H04L 41/0866* (2013.01); *H04L 63/08* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 6,968,360 | B1 * | 11/2005 | Morrow | H04M 3/537 709/206 |
| 7,310,673 | B2 * | 12/2007 | Zhu | G06F 9/50 709/226 |
| 7,447,709 | B1 * | 11/2008 | Rozenman | G06F 16/2443 |
| 7,950,010 | B2 * | 5/2011 | Goger | G06F 8/61 717/178 |
| 9,954,729 | B1 * | 4/2018 | Nolan | H04L 41/22 |
| 9,971,595 | B1 * | 5/2018 | Thompson | G06F 16/2365 |
| 10,949,401 | B2 * | 3/2021 | Nikolov | G06F 16/275 |
| 2004/0202107 | A1 * | 10/2004 | Bensimon | H04W 28/10 370/229 |
| 2012/0071219 | A1 * | 3/2012 | Belmarch | A63F 13/537 463/2 |
| 2012/0311116 | A1 * | 12/2012 | Jalan | H04L 67/34 709/222 |

(Continued)

FOREIGN PATENT DOCUMENTS

JP 4285679 B2 * 6/2009

*Primary Examiner* — Lance Leonard Barry
(74) *Attorney, Agent, or Firm* — Mughal Gaudry & Franklin PC

(57) ABSTRACT

Systems and methods described herein related to real-time management of service deployment systems are disclosed. A management system may monitor an infrastructure environment repository in real-time. Differences in configurations stored within the repository may be identified and used to generate configuration data. The configuration data may be used to update service operating parameters and service deployment configurations. The configuration data may be used to generate deployment data comprising location information of the updated infrastructure environment. The deployment data may be utilized to deploy one or more services on an updated infrastructure using the updated services.

20 Claims, 7 Drawing Sheets

(56) References Cited

U.S. PATENT DOCUMENTS

| | | | |
|---|---|---|---|
| 2015/0019701 A1* | 1/2015 | Marvin | G06F 9/542 |
| | | | 709/223 |
| 2015/0095283 A1* | 4/2015 | Kristoffersen | G06Q 10/06 |
| | | | 707/624 |
| 2015/0156078 A1* | 6/2015 | Elias | H04L 41/5058 |
| | | | 709/223 |
| 2015/0220579 A1* | 8/2015 | Gaur | G06F 16/93 |
| | | | 707/745 |
| 2016/0212242 A1* | 7/2016 | Beck | G06F 3/165 |
| 2018/0084038 A1* | 3/2018 | Johnson | H04L 67/18 |
| 2018/0351790 A1* | 12/2018 | Khemani | H04L 41/08 |
| 2020/0104478 A1* | 4/2020 | Chauhan | G06F 16/27 |
| 2020/0264902 A1* | 8/2020 | Driesen | G06F 8/36 |
| 2020/0351178 A1* | 11/2020 | Guha | H04L 41/142 |

\* cited by examiner

SYSTEMS AND METHODS FOR REAL-TIME REPOSITORY MANAGEMENT FOR UNIVERSAL SERVICE DEPLOYMENT

FIELD

The present disclosure relates generally to systems and methods for real-time repository management for universal service deployment. More specifically, the present disclosure relates to systems and methods for real-time monitoring, parsing, and incorporation of deployment configurations in a service infrastructure.

BACKGROUND

Digital services are provided to customers in a variety of formats and geographic locations. One factor that greatly affects the performance efficiency of a digital service is the location of a computer infrastructure on which the service is deployed. A customer using the digital service may experience service outages, interaction delays, and latency issues if the customer device is located geographically far from the computer infrastructure. For this reasons, digital service providers frequently build new infrastructures to deploy services in a more efficient manner. A provider may choose to build a new service infrastructure in a location rather than require their customers accessing to connect to a distant existing infrastructure to access a service. If the customer were geographically far away from the distant existing infrastructure, the customer would experience the issues above. Building new infrastructures also improves the provider's existing infrastructures and networks by spreading out customer interactions to alleviate an infrastructure's total network traffic.

Changes to infrastructure configurations may be frequent as service providers continually build new geographic infrastructures and revise existing infrastructures. Efficient utilization of service infrastructures requires that the service provider and its managing teams to work with up-to-date configurations for deploying services. Working without synchronized configurations means that service provider teams may be deploying or managing services on improper infrastructures or according to outdated information. Synchronizing these deployment configurations among the various provider teams requires each team to manually update infrastructure configurations as they are created. For example, every time a new geographic service infrastructure is built by a team, that building team must communicate configuration changes to each other team through communication channels. The other teams must then receive the communication and then later query for, retrieve, and implement the new configuration. This process is required for every individual team, making prompt configuration synchronization highly difficult, especially for larger service providers Inefficient communications regarding, accessing of, and updating the new configuration data may hinder service performance and delay service deployment, hurting both the service provider and its customers.

SUMMARY

Certain aspects and features of the present disclosure relate to systems and methods for managing infrastructure repositories to synchronize service deployment configurations in real-time. Specifically, the systems and methods described herein relate to real-time monitoring and management of a deployment infrastructure configuration to facilitate real-time synchronization of infrastructure configurations across a variety of deployment devices and services. As described herein, the term "real-time" may refer to an action or process that occurs, in a temporal sense, nearly instantaneously or in near immediate response to another action or process. Real-time monitoring and management of the deployment infrastructure configuration will allow a system to utilize a most up-to-date configuration for continued deployment of services. The system may also propagate synchronized updates in real-time to a number of services and deploying client devices to eliminate inefficient and incorrect deployments to the benefit of the service provider and its customers.

A real-time monitoring and synchronization system may manage a repository of configuration changes to this end. For example, a repository may store information related to a current infrastructure configuration. The repository may be an environment repository, which hosts an infrastructure configuration comprising a number of geographical deployment infrastructure environments on which a service may be deployed. The environment repository may comprise an existing state. The existing state may represent an existing configuration of one or more existing infrastructure environments for deploying a service. For example, the configuration stored in the environment repository may contain data for a plurality of geographically distinct infrastructures comprising systems and devices on which a service may be deployed and hosted for use by customers. When a new geographically distinct cluster of systems and devices becomes available for deployment of services, new data may also be required to use the new cluster.

The environment repository may therefore be updated to replace the existing state and existing data with a updated state and updated data for deploying a service on the full up-to-date configuration of infrastructures. The updated state may represent the updated configuration including the new infrastructure environment for deploying a service. The corresponding data may also include updated data utilizable to deploy a service on the newly added infrastructure environment. For example, an entity, such as a team responsible for building new geographic infrastructures for service deployment, may update the environment repository with the new state and data when the new infrastructure has been built and is ready to deploy a service at a location. Previously, this team would manually contact each other team directly or indirectly and require the team(s) the manually update its own existing configurations to allow to use new infrastructure for service deployment.

As discussed in various embodiments herein, a novel technical system is deployed for real-time management and synchronization of infrastructure configurations through interactions with the environment repository and other system elements. The system may be a service deployment management system that may manage an environment repository and synchronize configurations across a number of clients and services in real-time to prevent inefficient and costly incorrect service deployments. The service deployment management system may monitor the environment repository in real-time to detect and monitor updates to the environment repository.

In response to determining that the environment repository contains an updated state, the service deployment management system may parse and/or receive data from the environment repository related to infrastructure configuration updates, in real-time. For example, the service deployment management system may parse the environment repository having an updated state and may responsively store data related to the one or more updated infrastructure environments. The data may reflect a complete updated state or differences between the updated state and the existing state. Using this data, the service deployment management system may then responsively generate a unique set of configuration data. The configuration data may correspond to a plurality of combined infrastructure environments for deploying a service, the combined infrastructure environments representing both previous and new infrastructure for deploying the service. For example, the generated configuration data may correspond to a combined listing of existing infrastructure environments which were previously available for deploying a service, and new infrastructure environments, just added to the environment repository, for deploying a service.

The service deployment management system may then responsively send the configuration data to a deployment repository for storage and configuration synchronization. The configuration data may be used to synchronize a number of deployable services to deploy on the new infrastructure. For example, the generated configuration data stored on the deployment repository may be used to update one or more services or service parameters to accept the new configuration. In this case, one or more deployable services may be updated, in real-time, to accept the updated infrastructure configuration to prevent compatibility issues when the one or more deployable services are deployed on a new infrastructure environment. The configuration data may be further utilized to update one or more client devices in real-time.

The client devices may be devices utilized by one or more deployment teams to deploy a service on a particular infrastructure on behalf of a service provider. To synchronize the client devices in real-time, unique deployment data may be generated responsive to storage of the configuration data in the deployment repository. The deployment data may correspond to updated operational parameters for the client devices, which may be used to deploy a service on the updated infrastructure configuration. For example, the generated deployment data may be distributed to the client devices in real-time and usable to deploy a service on any of the combined infrastructure environments specified by the environment repository, alleviating the need to contact other teams and manually update deployment parameters.

The novel technical system for real-time monitoring and synchronization of deployment infrastructures described herein will alleviate or eliminate the identified issues with manual communication and updating of deployment configurations. Real-time monitoring and responsive parsing of an environment repository eliminates inefficient and costly manual communications previously required between teams. The service deployment management system described herein also improves system functions by requiring fewer manual accesses of the environment repository, in many cases by every individual team, to propagate updates, improving repository security. Additionally, ensuring up-to-date and consistent infrastructure configuration utilization, in real-time, across each team improves security and eliminates potential compatibility issues for service deployment. Responsive real-time propagation of updated infrastructure configurations ensures that a service provider is continuously utilizing best practices to deploy and maintain services efficiently to the benefit of both a service provider and its customers. Additional detailed example embodiments and practical applications of the methods described herein can be found thought this descriptions and in particular in sections 5.0 and 6.0 below.

In various embodiments, the real-time deployment management methods above may be performed as part of a cloud-based system. For example, the service deployment management system may be a cloud system communicatively coupled to any of the environment repository, the deployment repository, the one or more computing devices, etc. Sending and receiving of data may be facilitated between components of a cloud-based system through a cloud-based network. The service deployment repository may send a request for the updated state to environment repository in response to determining an update has occurred. The environment repository may provide the updated state to the service deployment management system in response. Configuration data generated by the service deployment management system may be send via a cloud-based network to deployment repository. One or more computing devices may receive the deployment data from the deployment repository via a cloud-based network.

In various embodiments, a real-time notification process may operate in parallel with the real-time deployment management processes described above. A real-time notification system may monitor changes to an environment repository and track data generation performed by the service deployment management system. In various embodiments, the real-time notification system may alter a user that a new environment is ready for deploying a service. In various further embodiments, the real-time notification system may provide a comprehensive analysis of updated configuration features for use in service deployments. For example, a notification system may alter a client device that a new environment has been added to the configuration, an existing environment has been deleted from the configuration, one or more features of an existing environment have been updated, etc.

In various embodiments, a computer-program product is provided that is tangibly embodied in a non-transitory machine-readable storage medium. The computer-program product can include instructions configured to cause one or more data processors to perform part or all of a method disclosed herein. In various embodiments, a system is provided. The system can include one or more data processors and a non-transitory computer readable storage medium containing instructions which, when executed on the one or more data processors, cause the one or more data processors to perform part or all of a method disclosed herein.

Advantageously, embodiments of the present disclosure relate to real-time deployment environment management methods and systems. The deployment management system reduces inefficient resource expenditure previously required when updating a deployment infrastructure and synchronizing deploying entity systems. Notably, deployment system configurations may be updated in real-time and without user interaction to eliminate costly communications, manual updates, and improper service deployment.

The following detailed description together with the accompanying drawings will provide a better understanding of the nature and advantages of the present disclosure.

BRIEF DESCRIPTION OF THE DRAWINGS

Illustrative embodiments of the present invention are described in detail below with reference to the following drawing figures.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

The sections of this description follow the below sectional organization.

Figure 1:
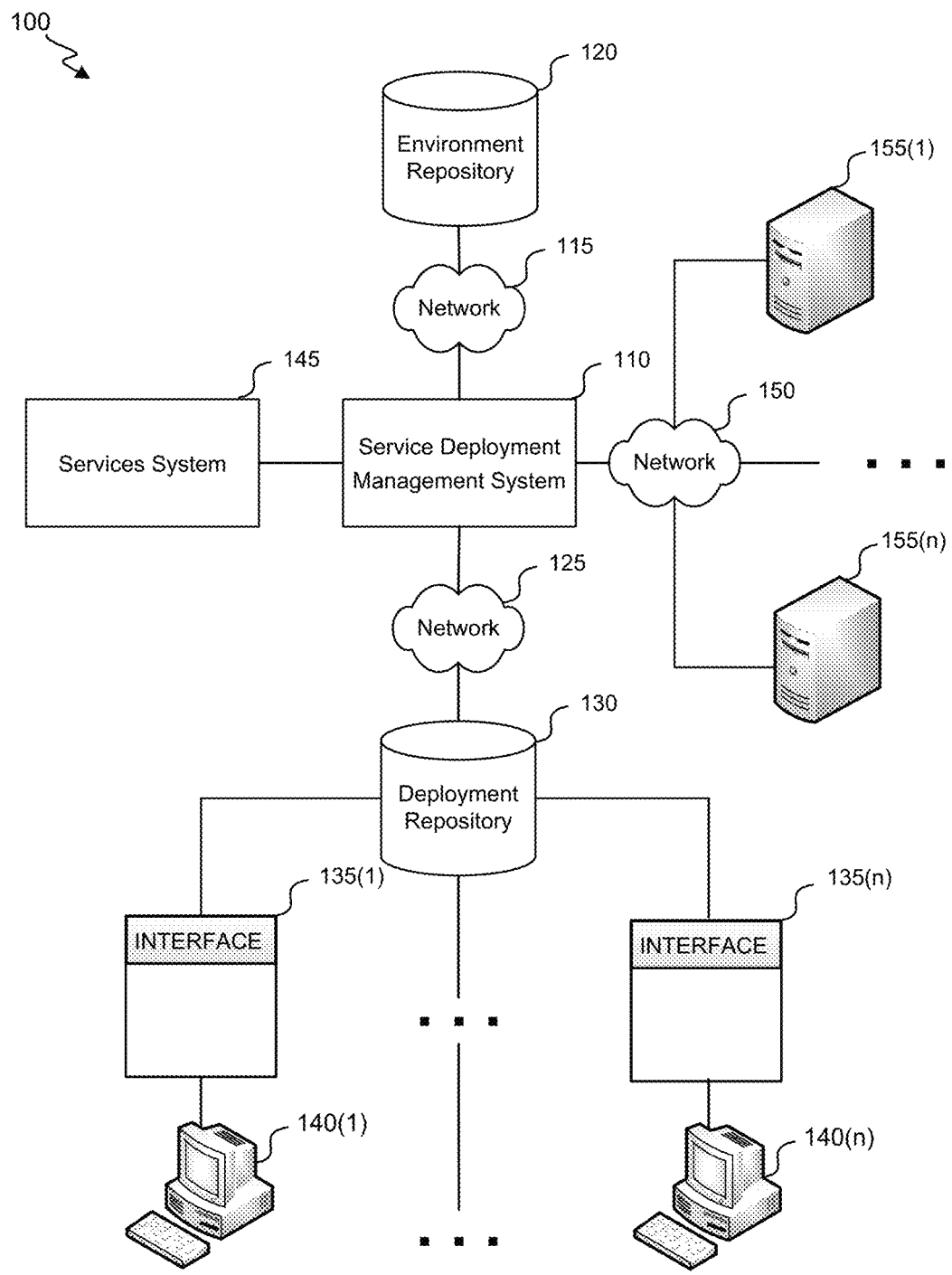
FIG. 1 shows an example network for managing updates to service deployment systems.

1.0 Example Networks for Real-Time Deployment Management
2.0 Example Processes for Real-Time Deployment Management
3.0 Example Interfaces for Real-Time Deployment Management
4.0 Example Systems for Real-Time Deployment Management
5.0 Example Embodiments for Real-Time Deployment Management
6.0 Practical Applications 1.0 Example Networks for Real-Time Deployment Management FIG. 1 shows an example network 100 for managing updates to service deployment systems. Network 100 includes systems corresponding to multiple clients and to multiple locations. More specifically, each of service deployment management system 110, environment repository 120, security repository 145, deployment repository 130, and client devices 140(1)-140(n) can correspond to a set of devices and/or other components, such as one or more servers (e.g., and/or server farms or server clusters), user devices (e.g., desktop computers, laptops, tablets, or smart phones), data storage devices (e.g., network-attached storage), and/or equipment. The set of devices and/or other components can, in some instances be co-located, such as being located within one or more buildings or geographical areas associated with the client. In some instances, the clients need not be co-located but are connected via a network. For example, deployment servers 155(1)-155(n) may each be located in geographical areas distinct from other components described herein. In instances where different parts of a given client's system are at different locations, the systems may communicate via one or more networks, such as networks 115, 125, 150, or any other connection as depicted in FIG. 1.

A system can include multiple sub-systems. Each of the multiple sub-systems may, for example, be configured to perform a different type of operation, to use different resources (and/or different types of resources), to generate different types of outputs, to be located at different geographical locations, to correspond to (e.g., to grant access to) different agents or users (e.g., to different departments of an organization), and so on. The implementation depicted in FIG. 1 illustrates various types of resources of systems. It will be appreciated that these resources are illustrative. Resources represented by separate blocks may, but need not, correspond to separate devices or groups of devices.

In various embodiments, including the depiction of FIG. 1, network 100 comprises service deployment management system 110. Service deployment management system 110 may be any system, device, and/or entity which facilitates the methods described herein. In various embodiments, service deployment management system 110 is an system for managing deployment infrastructures on behalf of a service provider in real-time. For example, service deployment management system 110 may contain one or more subsystems, components, and/or sets of instructions for monitoring a deployment infrastructure and generating data related to updates in the infrastructure in real-time. Details of service deployment management system 110 are further described at least in FIG. 2 below.

In various embodiments, network 100 comprises environment repository 120. Environment repository 120 may be any system, device, storage, repository, or entity capable of storing and updating deployment environment states and data as described herein. For example, environment repository 120 may comprise one or more digital storage locations for storing digital information relating to deployment environments for a service. Environmental repository 120 may be a distributed versioned data management repository which can be edited by one or more credentialed users to push/pull digital source code or components to/from the repository.

Environment repository 120 may be communicatively coupled to service deployment management system 110 via a network such as network 115. Network 115 may be any network for facilitating communication between two entities, including an internet, an intranet, a local area network (LAN), a wireless connection, a hard-line connection, etc. In various embodiments, network 115 is a cloud-based network facilitating communication between environment repository 120 as a cloud-based storage and service deployment management system 110 as a cloud-based service. In various embodiments, service deployment management system 110 utilizes network 115 to autonomously monitor environment repository 120 without additional input from an entity. In various further embodiments, service deployment management system 110 utilizes network 115 to parse the contents and/or configuration of environment repository 120 to detect updates and/or changes to environment repository 120 or the contents stored thereon. In various further embodiments, environment repository 120 may utilize network 115 to send data and/or digital signals to service deployment management system 110 in response to a request from the latter.

In various embodiments, network 100 comprises deployment repository 130. Deployment repository 130 may be any system, device, storage, repository, or entity capable of storing and updating configuration and/or deployment data as described herein. For example, deployment repository 130 may comprise one or more digital storage locations for storing digital information relating to deployment configurations for a service.

Deployment repository 130 may be communicatively coupled to service deployment management system 110 via a network such as network 125. Network 125 may be any network for facilitating communication between two entities, including an internet, an intranet, a local area network (LAN), a wireless connection, a hard-line connection, etc. In various embodiments, network 125 is a cloud-based network facilitating communication between deployment repository 130 as a cloud-based storage and service deployment management system 110 as a cloud-based service. In various embodiments, service deployment management system 110 utilizes network 125 to send configuration data to deployment repository 130. In various further embodiments, deployment repository 130 stores the configuration data sent from service deployment management system 110 in an electronic storage comprised therein. In various further embodiments, deployment repository 130 may provide configuration data to a system, such as service deployment management system 110, to generate deployment data for deploying a service.

In various embodiments, network 100 comprises client devices 140(1)-140(n). A client device 140 may be a device that is utilized by a user/client to deploy a service on an infrastructure. For example, a client may be a service provider entity which utilizes a client device 140 and deployment data to deploy a service on a geographic infrastructure to provide the service to a number of customers of the service provider. Each of client devices 140(1)-140(n) may communicate with the deployment repository through a corresponding client interface 135(1)-135(n). A client interface 135 may be a software, hardware, or combination entity which facilitates communication between a client device and one or more entities in network 100. For example, a client device 140 may execute an instance of a client interface 135 which displays a visual representation of an updated infrastructure configuration through which a client may interact with deployment data to deploy a service.

In various embodiments, network 100 comprises deployment servers 155(1)-155(n). Deployment servers 155(1)-155(n) may be any system, device, server, cloud architecture, or entity capable of executing instructions for deploying, hosting, and/or maintaining a service. For example, a deployment server 155 may receive electronic instructions for executing a service thereon. Subsequently, the deployment server 155 may host and maintain the service and distribute access thereto to a number of customer devices which will utilize the service for some purpose. Deployment servers 155(1)-155(n) may be a distributed set of geographically distinct servers comprising electronic infrastructures that one or more credentialed client users may utilize to deploy a service at various locations.

Deployment servers 155(1)-155(n) may be communicatively coupled to service deployment management system 110 via a network such as network 150. Network 150 may be any network for facilitating communication between two entities, including an internet, an intranet, a local area network (LAN), a wireless connection, a hard-line connection, etc. In various embodiments, network 150 is a cloud-based network facilitating communication between deployment servers 155(1)-155(n) as a set of cloud-based infrastructure devices and service deployment management system 110 as a cloud-based service.

In various embodiments, network 100 comprises services system 145. Services system 145 may be an device, system, application, cloud-based service, and/or entity which is communicatively coupled to service deployment management system 110 to perform the processes described herein. In various embodiments, services system 145 comprises a services repository. The services repository may comprise one or more deployable services which may be deployed on an infrastructure environment. In various further embodiments, one or more deployable services in a services repository each comprise one or more service parameters, the one or more service parameters accepting an infrastructure environment as input. The one or more service parameters may be updated to accept new infrastructure environments as input when the services are updated according to the embodiments described herein.

In various embodiments, services system 145 comprises a security subsystem for managing credentialed interactions between components of network 100. For example, a security subsystem may store and interpret credentials passed as data between components of network 100 to ensure compliance with secure protocols. In various embodiments, a security subsystem operates as part of a cloud-based infrastructure service to facilitate permissible action between the components of network 100. In various further embodiments, the security subsystem may maintain permissions for a service deployment management system 110, which will be used to allow or deny access to any of the environment repository 120, the deployment repository 130, and/or the deployment services 155(1)-155(n). In various embodiments, the security subsystem may maintain permissions for a number of client devices 140(1) and 140(n), which will be used to allow or deny clients utilizing the client devices 140(1)-140(n) to deploy a service on an infrastructure environment via deployment servers 155(1)-155(n).

The network components described herein may be implemented as part of an integrated library operation. For example, the components and entities described above may implemented by a shared library-common pipeline library structure. One example library is the JENKINS® Library public available at Jenkins.io.

Figure 2:
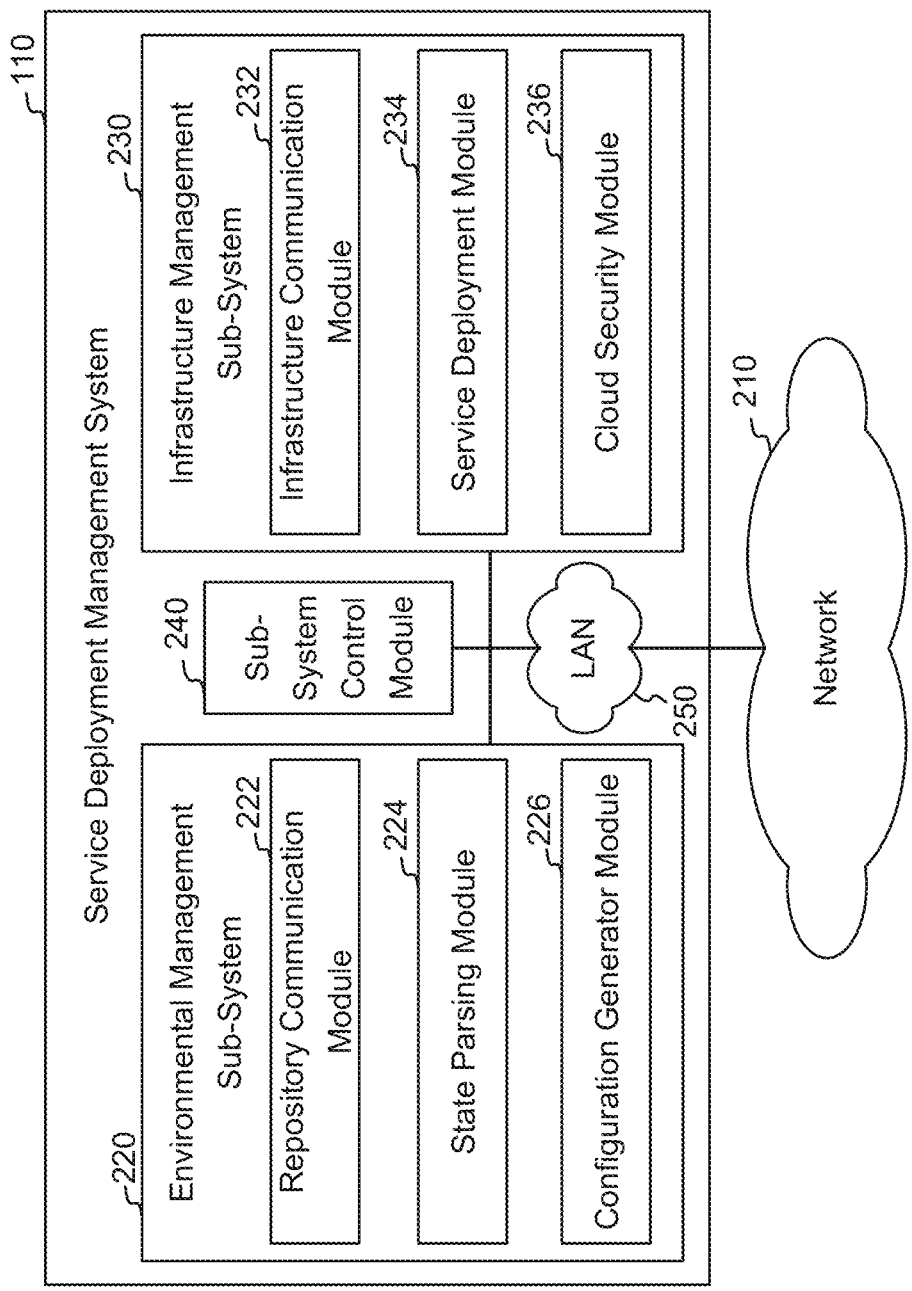
FIG. 2 shows a simplified block diagram of a service deployment management system.

FIG. 2 depicts a simplified block diagram of a service deployment management system 110. As depicted in FIG. 2, service deployment management system 110 may include one or more subsystems and/or modules for facilitating the processes described herein. The subsystems and modules depicted in FIG. 2 are not restrictive and service deployment management system 110 will be understood to comprise any number of subsystems/modules to facilitate the processes described herein.

In various embodiments, service deployment management system 110 comprises environmental management sub-system 220. Environmental management subsystem 220 may be a subsystem for interacting with an environmental repository such as environmental repository 120 and data generated therefrom. In various embodiments, environmental management sub-system 220 comprises a number of modules for facilitating the processes performed by environmental management subsystem 220 in a federated manner.

In various embodiments, environmental sub-system 220 comprises repository communication module 222. Repository communication module 222 may be a module for communication between deployment management system 110 and a repository. In various embodiments, repository communication module 222 facilitates real-time monitoring and management of a repository by a deployment management system 110. For example, repository communication module 222 may regularly and periodically parse, in real time, version information from a data repository to detect versioned changes to the repository. In various embodiments, repository communication module 222 may facilitate sending of communications and queries between deployment management system 110 and a repository. For example, repository communication module 222 may cause sending a query for data from a repository in response to determining that a version of a repository is updated.

In various embodiments, environmental sub-system 220 comprises state parsing module 224. Parsing module 224 may be a module for parsing state data in a repository. A state may refer to an previous, existing, or updated data sets stored within the repository. For example, a repository may comprise an updated state including an updated metadata set indicating a current version of the repository and an updated dataset including an updated infrastructure dataset for one or more updated infrastructure environments. In various embodiments, in response to determining that a repository has been updated, state parsing module 224 may parse data in the repository to determine one or more differences between an existing/previous state and an updated state. In various further embodiments, the determined differences are stored as temporary data within service deployment management system 110.

In various embodiments, environmental sub-system 220 comprises configuration generator module 226. Configuration generator module 226 may be a module for generating configuration data in response to parsing data in a repository. In various embodiments, configuration generation module 226 utilizes state data received by service deployment management system 110 to generate configuration data. The configuration data may correspond to an updated configuration of combined infrastructure environments for deploying one or more services. For example, configuration generation module 226 may utilize temporary data corresponding to one or more differences between states parsed in an environment repository to update or generate configuration data. The updated/generated configuration data may correspond to one or more combined infrastructure environments based on data in an updated state of the environment repository. In various embodiments, configuration generator module 226 utilizes engages repository communication module 222 to send the configuration data to a deployment repository, such as deployment repository 130. The configuration data generated by configuration generator module 226 may be in a similar or different format then the data on which is it based, for example, state data received from an environment repository.

In various embodiments, service deployment management system 110 comprises infrastructure management sub-system 230. Infrastructure management sub-system 230 may be a subsystem for interacting with client devices, server devices, and deploying services in conjunction with both device groups. In various embodiments, infrastructure management sub-system 230 comprises a number of modules for facilitating the processes performed by infrastructure management sub-system 230 in a federated manner.

In various embodiments, infrastructure management sub-system 230 comprises infrastructure communication module 232. Infrastructure communication module 232 may be a module for communication between components in a network, such as network 100. For example, infrastructure communication module 232 may facilitate communication between a client device 140 attempting to deploy a service, and a deployment server 155 on which the service will be deployed. In another example, infrastructure communication module 232 may route configuration data stored in a deployment repository 130 to a services repository hosting on a services system such as services system 145. For example, infrastructure communication module 232 may route configuration data stored on a deployment repository to a services repository to cause updating of the parameters of one or more services stored thereon to accept updated parameters related to the configuration data in real-time.

In various embodiments, infrastructure management sub-system 230 comprises service deployment module 234. Service deployment module 234 may be a module for facilitating deployment of a service on one or more particular infrastructures. In various embodiments, service deployment module 234 may utilize configuration data from a deployment repository to generate deployment data executable to deploy a service on a particular structure. For example, service deployment module 234 may use configuration data stored on deployment repository 130 to generate deployment data which will be distributed to one or more client devices 140(1)-140(n). The one or more client devices may use this data to execute a deployment operation which will cause deploying a service on one or more deployment servers 155(1)-155(n). In various embodiments, service deployment module 234 facilitates communications between one or more client devices 140(1)-140(n) and one or more deployment servers 155(1)-155(n). Service deployment module 234 may facilitate these communications to prevent direct control over a particular deployment server 155 by a particular client device 140. For example, service deployment module 234 may determine that a particular deployment server 155 is not a most-efficient deployment server for hosting a service. The service deployment module 234 may block a deployment request by a particular client device 140 or provide a warning to the particular client device 140 that the particular deployment server 155 is not a most-efficient deployment server for hosting a service.

In various embodiments, infrastructure management sub-system 230 comprises cloud security module 236. Cloud security module 236 may be a module for facilitating interactions between components of a network, such as network 100. In various embodiments, cloud security module 236 interacts with a system, such as services system 145, as part of a cloud-based security process using security data stored by services system 145 or the service deployment management system 110. For example, cloud security module 236 may communicate with services system 145 to receive and interpret cloud-service based credentials from interacting components. In various embodiments, cloud security module 236 receives and interprets access credentials when service deployment management system 110 interacts with a component in a network, such as network 100. For example, in response to receiving a request from a client device 140 to deploy a service on a deployment server 155, cloud security module 236 may verify cloud-enable credentials from the client device 140 before the service will be deployed on the deployment service 155. In various further embodiments, a client authentication dataset is held by a client device to authenticate a deployment specified by the client device. Secure deployment data comprising a secure authentication dataset for deploying a service may be compared to the client authentication dataset to ensure a client has security permissions to deploy a service. It will be appreciated that any processes and methods discussed herein may include cloud-based credential authorizations as a supplementary aspect of any described operations.

In various embodiments, service deployment management system 110 comprises sub-system control module 240. Sub-system control module 240 may be a module for facilitating control of and/or communications between various subsystems in service deployment management system 110. For example, sub-system control module may allow an administrator to access and control the sub-systems and modules of service deployment management system 110 to facilitate the methods and processes described herein. In various embodiments, sub-system control module 240 facilitates direct communication and interaction between the various sub-systems and modules of service deployment management system 110. For example environmental management sub-system 220 and any modules included therein may interact and/or exchange data with any infrastructure management sub-system 230 and any modules included therein.

In various embodiments, service deployment management system 110 comprises local area network (LAN) 250. LAN 250 may be a network internal to service deployment management system 110. LAN 250 may provide a communicative medium between various components of service deployment management system 110, such as environmental management sub-system 220, infrastructure management sub-system 230, and/or sub-system control module 240. LAN 250 may be further coupled to an external network 210. External network 210 may be any network including networks described herein. Network 210 may allow communication between service deployment management system 110 and other components of a network, such as network 100, via LAN 250.

2.0 Example Processes for Real-Time Deployment Management

Figure 3:
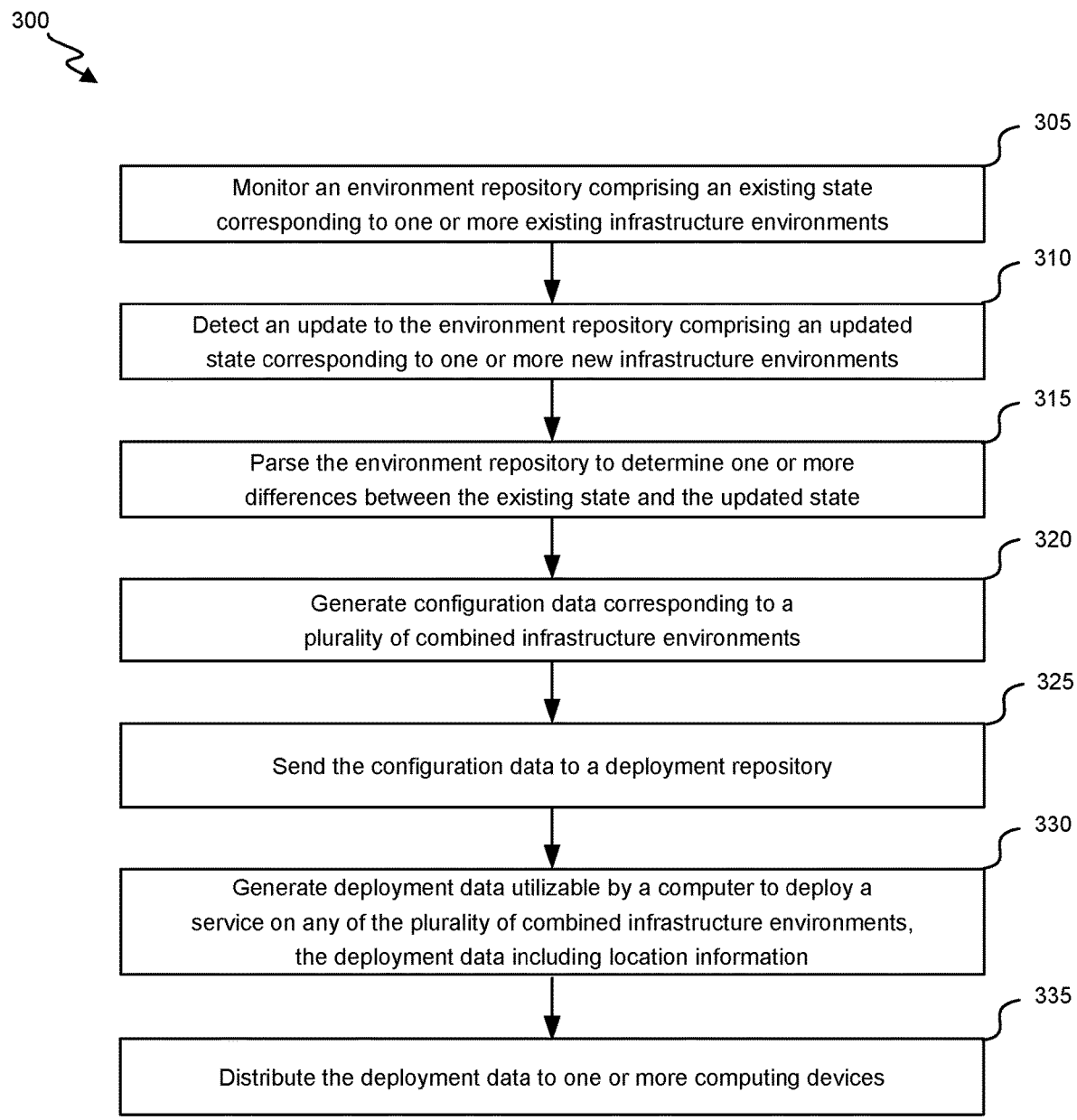
FIG. 3 is a flowchart illustrating a process for managing and updating service deployment systems.

FIG. 3 is a flowchart illustrating a process for managing and updating service deployment systems. Process 300 begins at block 305, by monitoring an environment repository comprising an existing state corresponding to one or more existing infrastructure environments. In various embodiments, the monitoring is performed in real time by a system, such as service deployment management system 110. In various embodiments, monitoring the environment repository comprises regularly querying, without additional input or instruction, for data related to a state of a repository. In various further embodiments, a module such as repository communication module 222 causes monitoring of the environment repository.

At block 310, the process continues by detecting an update to the environment repository comprising an updated state corresponding to one or more new infrastructure environments. The update may be detected by a dedicated module of the service deployment management system 110, such as repository communication module 222. In various embodiments, detecting an update comprises detecting, in real-time and without addition input or instructions, that one or more aspects of an environment repository do not correspond to a previous or existing state previously detected at the repository.

At block 315, the process continues by parsing the environment repository to determine one or more differences between the existing state and the updated state. The parsing may comprise storing, in a memory, the existing state and the updated state. The differences may then be determined by parsing each state in sequence or in parallel to determine differences between the stored states. In various embodiments, a dedicated module parses the environment repository, such as state parsing module 224. In various embodiments, data may be stored corresponding to the determined differences between the existing state and the updated state.

At block 320, the process continues by generating configuration data corresponding to a plurality of combined infrastructure environments. The generating configuration data may comprise using the determined one or more differences between the existing and updated states to generate the configuration data. For example, the generated configuration data is full configuration data corresponding to a full configuration. The full configuration may be based on the updated state contain additional metadata corresponding to matching existing configurations based on the existing state. In another example, the generated configuration data is differential configuration data. The differential configuration data may be data corresponding to an incomplete configuration which will be added to existing configuration data to generate a full configuration data. In various embodiments, generating the configuration data is performed by a module of service deployment management system 110, such as configuration generator module 226.

At block 325, the process continues by sending the configuration data to a deployment repository. The sending may comprise sending, by the service deployment management system 110 to a deployment repository, such as deployment repository 130. In various embodiments, the deployment repository may store the deployment data in response to receiving it. In various embodiments, the deployment repository may cause consolidating the generated configuration data with existing configuration data in the deployment repository. In various embodiments, the configuration data stored in the deployment repository may correspond to an updated configuration of a deployment server infrastructure for deploying a service.

In various embodiments not depicted in FIG. 3, the configuration data stored in the deployment repository may be sent to a services system, such as services system 145. The services system may utilize the configuration data to update one or more services. Updating the one or more services may comprise updating one or more deployment parameters of each of the one or more services. An entire set, or a subset of parameters may be updated as part of the updating process. In various embodiments, updating the one or more deployment parameters of the one or more services may comprise executing an update service. The update service, when executed, may cause real-time updating of the one or more deployment parameters. The update service may be executed in response to the generation of the configuration data, the sending of the configuration data to the deployment repository, the storing of the configuration data, or any of the other steps described herein.

At block 330, the process continues by generating deployment data utilizable by a computer to deploy a service on any of the plurality of combined infrastructure environments. Generating the deployment data may comprise generating, based on the configuration data stored in the deployment repository, deployment data which is executable to deploy a service. In various embodiments, the deployment data is generated by the service deployment management system 110. In various further embodiments, the service deployment management subsystem 110 comprises a module, such as service deployment module 234 which generates the deployment data. In various embodiments, deployment repository 130 or a component communicatively coupled to deployment repository 130 may generate the deployment data based on the configuration data. In further embodiments, a client device, such as client device 140, may generate the deployment data in real-time and in response to detecting the generated configuration data has been sent to the deployment repository.

In various embodiments, the deployment data comprises instructions for deploying a service on a particular environment infrastructure. For example, the deployment data may be executable instructions generated based on an updated configuration represented by the generated configuration data stored in the deployment repository. In various further embodiments, the deployment data is executable on a client device, such as client device 140, to cause facilitation of deployment of a service on a deployment server, such as deployment server 155. In various embodiments, the deployment data executable by a deployment server, such as deployment server 155 to cause deploying and maintaining a service on the deployment server.

At block 335, the process continues by distributing the deployment data to one or more computer devices. The one or more computer devices may be client devices, such as client devices 140(1)-140(n). The deployment data may be received by the client devices to cause updating an interface hosting by the client device, such as client interface 135. For example, in response to receiving deployment data, a client device may cause updating a client interface to include additional new deployment options for deploying a service on an environment infrastructure. In embodiments where the service deployment management system generates the deployment data, the deployment data may be distributed to each of the computer devices through a network, such as network 125. In embodiments where the deployment data is generated by the deployment repository or an adjacent system, the deployment data may be distributed by the deployment repository through a connection, such as a cloud-based service connection. In embodiments where the deployment data is generated by a particular client/computer device, the client/computer device may distributed the deployment data to other client/computer devices via a cloud, local, and/or hardwired connection.

In various embodiments not pictured in FIG. 3, each step of process 300 may be performed by networked components of a cloud-based system. For example, each device described herein may be a cloud-based system, device, service, storage, or other entity. Each step of the process may be performed as part of a cloud-based communication between cloud-based entities in a cloud-based network. For example, service deployment management system 110 may be a cloud-based service executing on a physical device, which is communicatively coupled to via a cloud-based network connection to multiple other cloud-based entities. The cloud-based service deployment management system may facilitate the process steps described above as part of a cloud-based network operation for deploying a cloud-based service to a cloud-based infrastructure server at a particular geographic location.

In various embodiments not described in FIG. 3, the process steps described above may be supplemented by a real-time notification generation system. The real-time notification generation system may send one or more notification in real time and responsive to any of the operations described herein. For example, a real-time notification generation system may generate a notification in response to step 310, the detection of an update to an environment repository. The real-time notification system may send notification data to one or more entities specifying that an update has been detected at an environment repository. In another example, the real-time notification system may generate a notification in response to step 315, the parsing of the environment repository to determine one or more differences between an existing state and an updated state. The real-time notification system may send notification data to one or more entities specifying that one or more changes have been detected. For example, the notification data may comprise an alert that at least one environment infrastructure is deleted from an updated configuration and should not be utilized to deploy a service.

3.0 Example Interfaces for Real-Time Deployment Management

Figure 4:
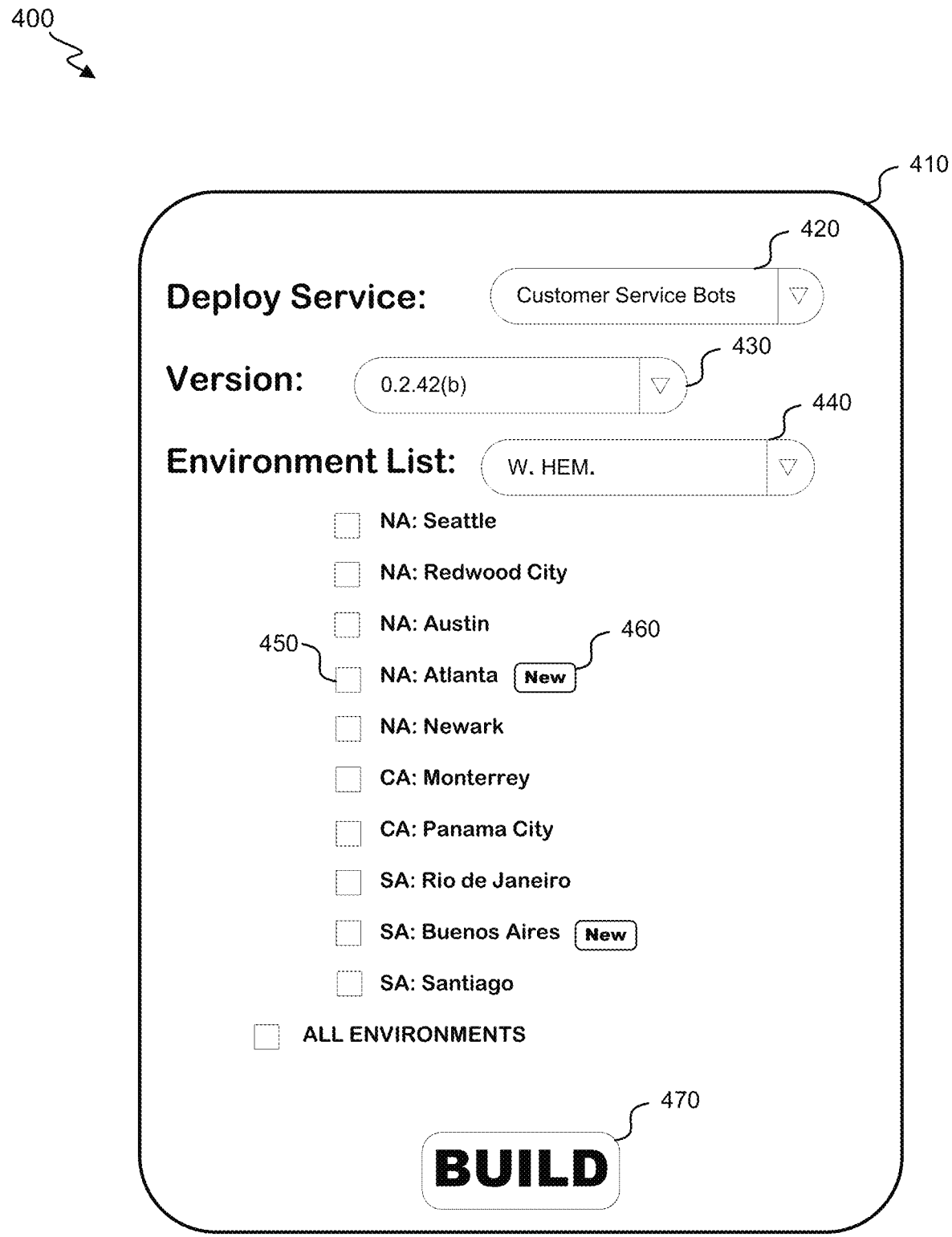
FIG. 4 depicts a simplified diagram interface for deploying services on updated infrastructures according to various embodiments.

FIG. 4 depicts a simplified diagram interface for deploying services on updated infrastructures according to various embodiments. Specifically interface environment 400 may represent an example interface environment displaying a result of process 300 described above. In various embodiments, interface environment 400 is an application hosted on client interface 135 of a client device 140. A client may interact with elements in interface environment 400 to facilitate the deployment of a service. Interface environment 400 may comprise interface 410. Interface 410 may be a visual interface or panel viewable by a client for viewing options for facilitating deployment of a service.

Interface 410 may comprise service selector 420. Service selector 420 may be an interactive element of interface 410 which allows a client to select a service for deployment. For example, service selector 420 is depicted in FIG. 4 as a drop-down menu of available services for deployment. In various embodiments, interactive options displayed as part of service selector 420 is limited to services comprising updated deployment parameters corresponding to an updated deployment configuration. Interface 410 may comprise version selector 430. Version selector 430 may be an interactive element of interface 410 which allows a client to select a version of a service for deployment. For example, version selector 430 is depicted in FIG. 4 as a drop-down menu of available versions of a service for deployment.

In various embodiments, service selector 420 and/or version selector 430 may be implemented as part of a central deployment authority configuration in which a central deployment authority, such as service deployment management system 110, specifies and controls deployments of services. In various embodiments not pictured in FIG. 4, applications and versions may be autonomously deployed on an individual digital pipeline or set of pipelines specific to a service. For example, a deployment requested by a client may cause a suite of services to be deployed to a particular geographic infrastructure. Each service of the suite of services may be automatically deployed via a designated pipeline or set of pipelines to the geographic infrastructure as part of the suite deployment.

Interface 410 may comprise region selector 440. Region selector 440 may be an interactive element of interface 410 which allows a client to select a service for deployment. For example, region selector 430 is depicted in FIG. 4 as a drop-down menu of regions corresponding to a list of available deployment environment infrastructures. Interface 410 may comprise one or more interactive environment selectors 450. An interactive environment selector 450 may be an interactive element of interface 410 which allows a client to specify whether or not a selected service is to be deployed on a corresponding environment infrastructure. For example, interactive environment selector 450 is depicted in FIG. 4 as a binary choice check-box for indicating a binary decision of whether or not a selected service is deployed on a particular corresponding environment infrastructure.

Interface 410 may comprise one or more infrastructure notifications 460. An infrastructure notification 460 may be a notification or data signal indicating some facet of a corresponding environment infrastructure. For example, infrastructure notification 460 is depicted in FIG. 4 as a notification indicating that a particular environment infrastructure is a new environmental infrastructure which was recently added to an updated configuration for service deployments. Interface 410 may comprise build button 470. Build button may be an interactive element of interface 410 for initiating a deployment process for deploying a particular selected service on one or more environment infrastructures. For example, build button 470 is depicted in FIG. 4 as an interactive digital button that, when pressed, will initiate a deployment procedure for deploying a particular selected version of a particular selected service on one or more particular selected environment infrastructures of a particular selected region.

4.0 Example Systems for Real-Time Deployment Management

Figure 5:
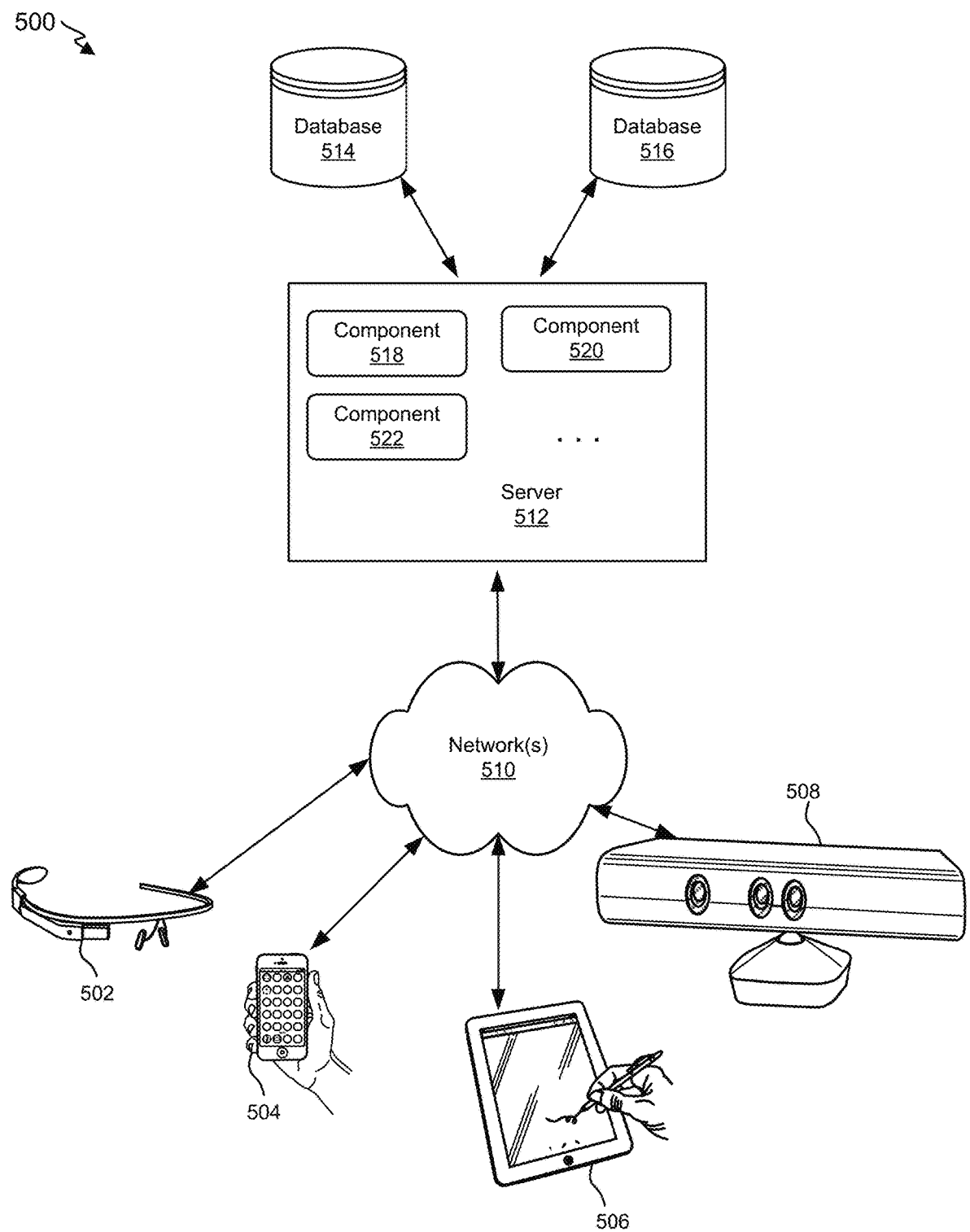
FIG. 5 depicts a simplified diagram of a distributed system for implementing one of the embodiments.

FIG. 5 depicts a simplified diagram of a distributed system 500 for implementing one of the embodiments. In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. Server 512 may be communicatively coupled with remote client computing devices 502, 504, 506, and 508 via network 510.

In various embodiments, server 512 may be adapted to run one or more services or software applications provided by one or more of the components of the system. In various embodiments, these services may be offered as web-based or cloud services or under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in the figure, the software components 518, 520 and 522 of system 500 are shown as being implemented on server 512. In other embodiments, one or more of the components of system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in the figure is thus one example of a distributed system for implementing an embodiment system and is not intended to be limiting.

Client computing devices 502, 504, 506, and/or 508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 502, 504, 506, and 508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 510.

Although exemplary distributed system 500 is shown with four client computing devices, any number of client computing devices may be supported. Other devices, such as devices with sensors, etc., may interact with server 512.

Network(s) 510 in distributed system 500 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), such as one based on Ethernet, Token-Ring and/or the like. Network(s) 510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 512 may be adapted to run one or more services or software applications described in the foregoing disclosure. For example, server 512 may correspond to a server for performing processing described above according to an embodiment of the present disclosure.

Server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more databases 514 and 516. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle, that are adapted to store, update, and retrieve data in response to SQL-formatted commands.

Figure 6:
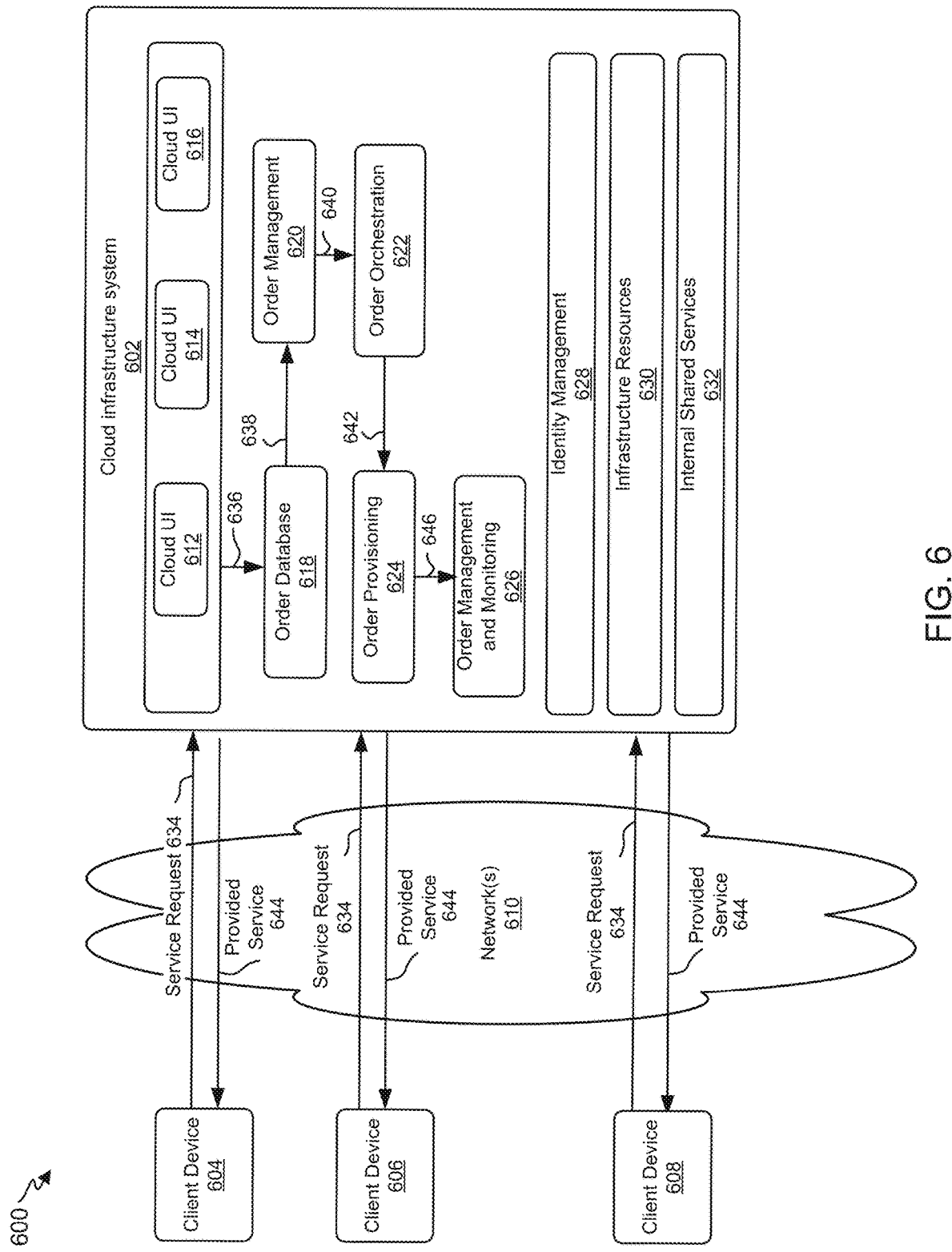
FIG. 6 is a simplified block diagram of components of a system environment by which services provided by the components of an embodiment system may be offered as cloud services, in accordance with an embodiment of the present disclosure.

FIG. 6 is a simplified block diagram of one or more components of a system environment 600 by which services provided by one or more components of an embodiment system may be offered as cloud services, in accordance with an embodiment of the present disclosure. In the illustrated embodiment, system environment 600 includes one or more client computing devices 604, 606, and 608 that may be used by users to interact with a cloud infrastructure system 602 that provides cloud services. The client computing devices may be configured to operate a client application such as a web browser, a proprietary client application (e.g., Oracle Forms), or some other application, which may be used by a user of the client computing device to interact with cloud infrastructure system 602 to use services provided by cloud infrastructure system 602.

It should be appreciated that cloud infrastructure system 602 depicted in the figure may have other components than those depicted. Further, the embodiment shown in the figure is only one example of a cloud infrastructure system that may incorporate an embodiment of the invention. In some other embodiments, cloud infrastructure system 602 may have more or fewer components than shown in the figure, may combine two or more components, or may have a different configuration or arrangement of components.

Client computing devices 604, 606, and 608 may be devices similar to those described above for 402, 404, 406, and 408.

Although exemplary system environment 600 is shown with three client computing devices, any number of client computing devices may be supported. Other devices such as devices with sensors, etc. may interact with cloud infrastructure system 602.

Network(s) 610 may facilitate communications and exchange of data between clients 604, 606, and 608 and cloud infrastructure system 602. Each network may be any type of network familiar to those skilled in the art that can support data communications using any of a variety of commercially-available protocols, including those described above for network(s) 610.

Cloud infrastructure system 602 may comprise one or more computers and/or servers that may include those described above for server 412.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 602 may be adapted to automatically provision, manage and track a customer's subscription to services offered by cloud infrastructure system 602. Cloud infrastructure system 602 may provide the cloud services via different deployment models. For example, services may be provided under a public cloud model in which cloud infrastructure system 602 is owned by an organization selling cloud services (e.g., owned by Oracle) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In various embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 602. Cloud infrastructure system 602 then performs processing to provide the services in the customer's subscription order.

In various embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In various embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In various embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 602 may also include infrastructure resources 630 for providing the resources used to provide various services to customers of the cloud infrastructure system. In one embodiment, infrastructure resources 630 may include pre-integrated and optimized combinations of hardware, such as servers, storage, and networking resources to execute the services provided by the PaaS platform and the SaaS platform.

In various embodiments, resources in cloud infrastructure system 602 may be shared by multiple users and dynamically re-allocated per demand. Additionally, resources may be allocated to users in different time zones. For example, cloud infrastructure system 630 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 632 may be provided that are shared by different components or modules of cloud infrastructure system 602 and by the services provided by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 602, and the like.

In one embodiment, as depicted in the figure, cloud management functionality may be provided by one or more modules, such as an order management module 620, an order orchestration module 622, an order provisioning module 624, an order management and monitoring module 626, and an identity management module 628. These modules may include or be provided using one or more computers and/or servers, which may be general purpose computers, specialized server computers, server farms, server clusters, or any other appropriate arrangement and/or combination.

In exemplary operation 634, a customer using a client device, such as client device 604, 606 or 608, may interact with cloud infrastructure system 602 by requesting one or more services provided by cloud infrastructure system 602 and placing an order for a subscription for one or more services offered by cloud infrastructure system 602. In certain embodiments, the customer may access a cloud User Interface (UI), cloud UI 612, cloud UI 614 and/or cloud UI 616 and place a subscription order via these UIs. The order information received by cloud infrastructure system 602 in response to the customer placing an order may include information identifying the customer and one or more services offered by the cloud infrastructure system 602 that the customer intends to subscribe to.

After an order has been placed by the customer, the order information is received via the cloud UIs, 612, 614 and/or 616.

At operation 636, the order is stored in order database 618. Order database 618 can be one of several databases operated by cloud infrastructure system 618 and operated in conjunction with other system elements.

At operation 638, the order information is forwarded to an order management module 620. In some instances, order management module 620 may be configured to perform billing and accounting functions related to the order, such as verifying the order, and upon verification, booking the order.

At operation 640, information regarding the order is communicated to an order orchestration module 622. Order orchestration module 622 may utilize the order information to orchestrate the provisioning of services and resources for the order placed by the customer. In some instances, order orchestration module 622 may orchestrate the provisioning of resources to support the subscribed services using the services of order provisioning module 624.

In certain embodiments, order orchestration module 622 enables the management of business processes associated with each order and applies business logic to determine whether an order should proceed to provisioning. At operation 642, upon receiving an order for a new subscription, order orchestration module 622 sends a request to order provisioning module 624 to allocate resources and configure those resources needed to fulfill the subscription order. Order provisioning module 624 enables the allocation of resources for the services ordered by the customer. Order provisioning module 624 provides a level of abstraction between the cloud services provided by cloud infrastructure system 600 and the physical implementation layer that is used to provision the resources for providing the requested services. Order orchestration module 622 may thus be isolated from implementation details, such as whether or not services and resources are actually provisioned on the fly or pre-provisioned and only allocated/assigned upon request.

At operation 644, once the services and resources are provisioned, a notification of the provided service may be sent to customers on client devices 604, 606 and/or 608 by order provisioning module 624 of cloud infrastructure system 602.

At operation 646, the customer's subscription order may be managed and tracked by an order management and monitoring module 626. In some instances, order management and monitoring module 626 may be configured to collect usage statistics for the services in the subscription order, such as the amount of storage used, the amount data transferred, the number of users, and the amount of system up time and system down time.

In certain embodiments, cloud infrastructure system 600 may include an identity management module 628. Identity management module 628 may be configured to provide identity services, such as access management and authorization services in cloud infrastructure system 600. In various embodiments, identity management module 628 may control information about customers who wish to utilize the services provided by cloud infrastructure system 602. Such information can include information that authenticates the identities of such customers and information that describes which actions those customers are authorized to perform relative to various system resources (e.g., files, directories, applications, communication ports, memory segments, etc.) Identity management module 628 may also include the management of descriptive information about each customer and about how and by whom that descriptive information can be accessed and modified.

Figure 7:
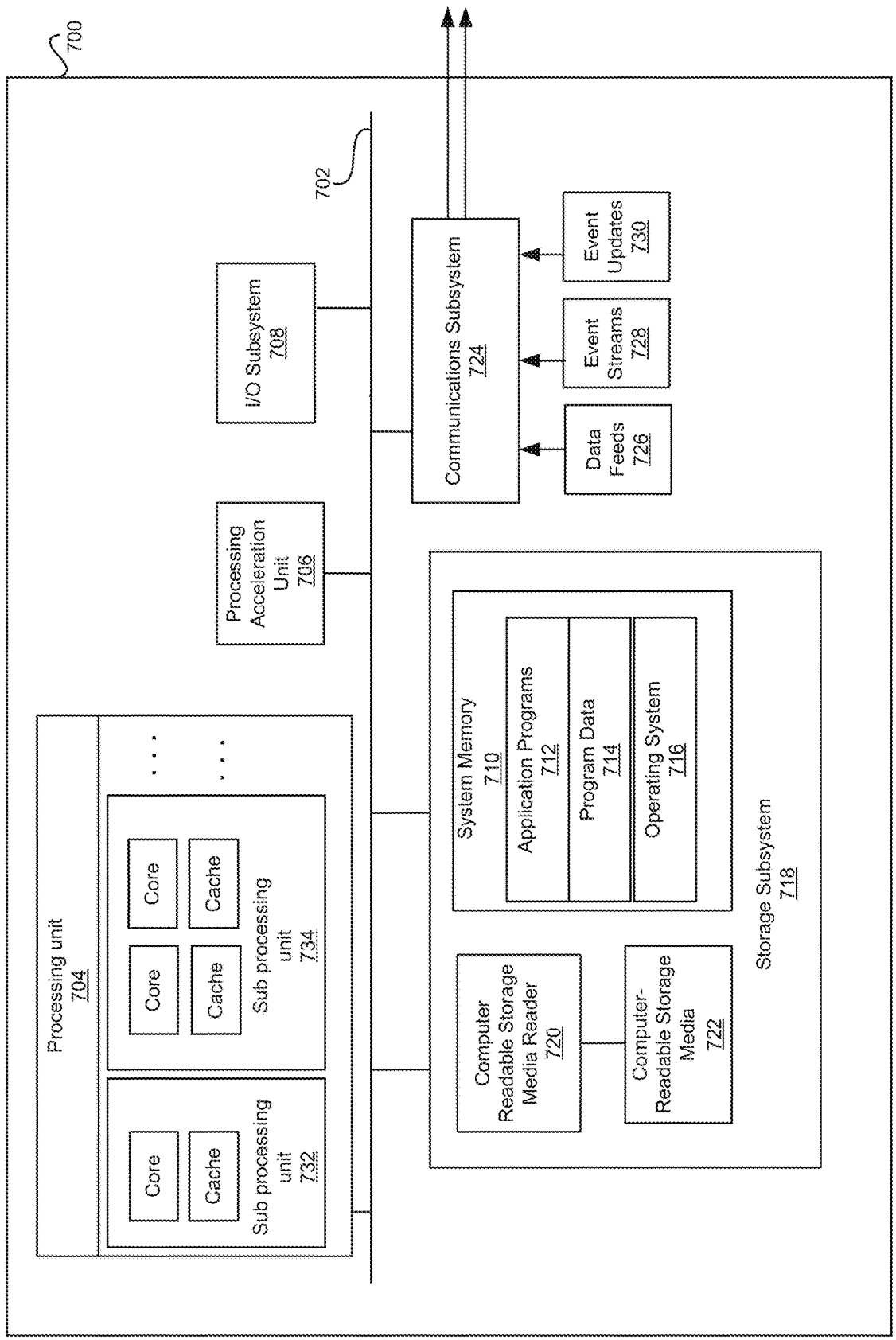
FIG. 7 illustrates an exemplary computer system, in which various embodiments of the present invention may be implemented.

FIG. 7 illustrates an exemplary computer system 700, in which various embodiments of the present invention may be implemented. The system 700 may be used to implement any of the computer systems described above. As shown in the figure, computer system 700 includes a processing unit 704 that communicates with a number of peripheral subsystems via a bus subsystem 702. These peripheral subsystems may include a processing acceleration unit 706, an input/output (I/O) subsystem 708, a storage subsystem 718 and a communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently executing programs or processes. At any given time, some or all of the program code to be executed can be resident in processor(s) 1204 and/or in storage subsystem 718. Through suitable programming, processor(s) 704 can provide various functionalities described above. Computer system 700 may additionally include a processing acceleration unit 706, which can include a digital signal processor (DSP), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as Musical Instrument Digital Interface (MIDI) keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with the present invention.

Storage subsystem 700 may also include a computer-readable storage media reader 1220 that can further be connected to computer-readable storage media 722. Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 700.

By way of example, computer-readable storage media 722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to connect to one or more devices via the Internet. In some embodiments communications subsystem 724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In various embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

5.0 Example Embodiments for Real-Time Deployment Management

The techniques, methods, and systems described herein are applicable to a variety of scenarios for improving service deployment through real-time, responsive, environmental repository management and infrastructure configuration synchronization. The embodiments described in this section are purely illustrative embodiments for implementing the techniques, methods, and systems described herein. The techniques, methods, and systems described herein are not limited to the example embodiments described in this section, which is included to provide one having ordinary skill in the art with hypothetical and detailed applications of the disclosed embodiments above.

In an illustrative example embodiment, a service provider infrastructure team creates and implements a new geographical infrastructure for deploying a service in ATLANTA, GA, USA. The geographical infrastructure includes physical computing devices such as servers to host and maintain services. The service provider already implements existing geographical infrasctrucutres in SAN JOSE, CA, USA, and AUSTIN, TX, USA. The infrastructure team updates an environment repository to an updated state when the new geographical infrastructure is available. The updated state comprises updated data for deploying a service at an individual infrastructure at each of these three individual geographic locations.

A service deployment management system detects the update to the environment repository in real-time. Responsive to detecting the update, the service deployment management system responsively signals the environment repository to send the updated data to the service deployment management system. The service deployment management system stores, in a temporary memory, the received updated data. Responsive to receiving the data, the service deployment management system generates new configuration data relating to the new deployment infrastructure configuration. The service deployment management system responsively signals a services system to begin updating one or more services to accept the newly generated configuration data as a parameter. Among the services is a "chatbot" service which is deployable to allow customers to interact with an automated support entity to resolve a problem.

The service deployment management system responsively sends the configuration data to a deployment repository where it is stored. The service deployment management system uses the configuration data stored in the deployment repository to generate new deployment data. The deployment data comprises data for updated interfaces, service deployment execution instructions, and location information for the updated services. The service deployment management system responsively distributes the generated deployment data to one or more client computers credentialed to deploy a service. At some point in the future, a client wishes to deploy the chatbots service to an infrastructure closest to a customer located in JACKSONVILLE, FL, USA. Upon opening a deployment interface at the client device, the client discovers the new ATLANTA deployment infrastructure in available. The client, previously unaware that a new infrastructure had been added, may now deploy the updated chatbots service on the ATLANTA infrastructure to more efficiently accommodate customer traffic from JACKSONVILLE.

In an another illustrative example embodiment, a service provider implements existing geographical infrastructures in SAN JOSE, and AUSTIN. The SAN JOSE infrastructure is taken offline due to security concerns. An infrastructure team updates an environment repository to an updated state. The updated state comprises updated data for deploying a service at only the AUSTIN infrastructure, as well as metadata signifying that the SAN JOSE infrastructure is unstable. A service deployment management system detects the update to the environment repository in real-time. Responsive to detecting the update, the service deployment management system responsively parses the environment repository to determine differences between the updated state and a previous existing state.

In response to determining the differences between the updated state and the previous existing state, the service deployment management system retrieves the metadata and generates new configuration data corresponding to the determined differences. The new configuration data omits the SAN JOSE infrastructure in the new deployment configuration. The service deployment management system immediately and responsively distributes a notification to all systems and/or client devices. The notification signals that the SAN JOSE infrastructure is unstable. The service deployment management system then responsively signals a services system to begin updating one or more services to accept the newly generated configuration data as a parameter. The new parameter is updated to not only accept the new configuration, but to also reject any previous configuration which includes the SAN JOSE infrastructure. Among the services is a "virtual machine" service which is deployable to allow customers to use a portion of an infrastructure's computing power to generate a "virtual computing" interface on their own customer device. This service may be highly vulnerable to unstable infrastructures.

The service deployment management system responsively sends the configuration data to a deployment repository where it is stored. The service deployment management system uses the configuration data stored in the deployment repository to generate new deployment data. The deployment data comprises data for updated interfaces, service deployment execution instructions, and location information for the updated services. The service deployment management system responsively distributes the generated deployment data to one or more client computers credentialed to deploy a service. At some point in the future, a client wishes to deploy the virtual machine service to the SAN JOSE infrastructure. Upon opening a deployment interface at the client device, the client discovers the SAN JOSE deployment infrastructure is no longer available for any service deployments. The client, who would have incorrectly deployed the service on an unstable or unavailable infrastructure, may now deploy the updated virtual machine service on only the stable AUSTIN infrastructure.

In an another illustrative example embodiment, a service provider already implements existing geographical infrastructures in SAN JOSE, CA, USA, and AUSTIN, TX, USA. The infrastructures are integrated into a cloud-based infrastructures in which cloud-based resources are shared between the individual SAN JOSE and AUSTIN infrastructures. The infrastructure team improves the AUSTIN infrastructure by adding additional physical server devices to a number of existing server devices in the AUSTIN location. The infrastructure team then updates a cloud-based environment repository to comprise an updated state. The updated state comprises updated data for utilizing the improved deployment capacity at the AUSTIN location. A cloud-based service deployment management system operating as part of a cloud-based deployment system detects the update to the environment repository in real-time.

Responsive to detecting the update, the service deployment management system responsively parses the environment repository to determine differences between the updated state and a previous existing state. In response to determining the differences between the updated state and the previous existing state, the service deployment management system generates new configuration data comprising data corresponding to the additional deployment capacity in the AUSTIN infrastructure. The service deployment management system immediately and responsively sends the configuration data to a cloud-based security/permissions system which stores credentials for accessing and utilizing cloud-based infrastructures. The security/permissions system sends, to the service deployment management system, new security credentials for accessing the additional resources of the AUSTIN infrastructure.

The service deployment management system then responsively signals a cloud-based services system to begin updating one or more cloud-based services to accept the newly generated configuration data as a parameter. The new parameter is updated to not only accept the new configuration, but to update security credentials for the cloud-based services so that they may deploy, at least in part, using the newly added AUSTIN infrastructure resources. Among the services is a cloud-based relational database service which is deployable to allow customers to view, access, and maintain a relational database through cloud services. The relational databases may be stored in cloud-based storage distributed across multiple physical server devices.

The service deployment management system responsively sends the configuration data to a cloud-based deployment repository where it is stored. The service deployment management system uses the configuration data stored in the deployment repository to generate new deployment data. The deployment data comprises data for updated interfaces, service deployment execution instructions, location information for the updated services, and new security credentials that client devices may use to utilize the additional resources at the AUSTIN infrastructure. The service deployment management system responsively distributes the generated deployment data to one or more cloud-connected client computers executing cloud-based communication software applications. At some point in the future, a client wishes to deploy the cloud-based relational database service to the cloud-based infrastructure. Upon opening a deployment interface at the client device, the client discovers the AUSTIN deployment infrastructure contains far more resource availability for hosting cloud-based services than the SAN JOSE infrastructure. The client may now choose to deploy the cloud-based relational database service using, in greater proportion, or in whole, resources available at the AUSTIN location.

6.0 Practical Applications

The systems and methods described herein are integrated into practical applications for the facilitation of real-time service deployment management. Real-time monitoring and parsing of environmental repositories eliminate procedures for manually synchronizing deployment environment infrastructures. Eliminating these procedures saves valuable computing resources, freeing these resources for additional computing power in other functional areas. Additionally, time and client resources are saved as infrastructure teams no longer must communicate with each other team and each other team no longer must manually pull configuration changes from the infrastructure repository. Responsive generation of updated infrastructure configurations and distribution of updated deployment data also allows client-side distributors to manage correct and efficient deployment infrastructures without the need to manually confirm configuration consistency. This improves efficiency by providing clients with updated configurations for deployment and prevents costly mistakes such as service deployment on unstable or defunct infrastructures. The elimination of costly manual procedures improves the utilization of computing resources while promoting efficient and consistent service management, especially in large and interdependent service deployment infrastructures.

Additionally, the methods and systems above improve cloud-computing activities when integrated into a cloud-computer environment. Real-time monitoring and updating of cloud-based deployment infrastructures greatly reduces inefficient and redundant cloud-based resources and promotes efficient and consistent utilization of a cloud framework. Additionally, the methods and systems above improve utilization of the deployment infrastructure itself through comprehensive and responsive notification data generation and distribution procedures. Comprehensive and responsive notification procedures reduce resource waste by eliminating costly and redundant communications between clients and/or systems that were previously required to verify infrastructure configurations and status.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   monitoring, by a service deployment management system, an environment repository, the environment repository comprising an existing state corresponding to one or more existing configurations for existing geographically distinct infrastructure environments comprising one or more devices on which a service having the one or more existing configurations is deployed;
   detecting an update to the environment repository, the update comprising an updated state, the updated state corresponding to a new configuration for an updated infrastructure environment that is different than the existing state for the one or more existing configurations for the existing geographically distinct infrastructure environments;
   in response to detecting the update to the environment repository, parsing, in sequence or in parallel, each state of the environment repository to determine one or more differences between the existing state and the updated state;
   generating, based on the determined one or more differences between the existing state and the updated state, configuration data, the configuration data used to synchronize a number of deployable services on a plurality of combined infrastructure environments, the plurality of combined infrastructure environments comprising at least the one or more existing configurations for the existing geographically distinct infrastructure environments and the new configuration for the updated infrastructure environment;
   sending the configuration data to a deployment repository;
   generating, based on the sent configuration data, deployment data, the deployment data utilizable by a computer to deploy the service having the new configuration on at least one infrastructure environment of the plurality of combined infrastructure environments, wherein:
      the deployment data comprises location information of the updated infrastructure environment, and
      the service having the new configuration is deployable on the at least one infrastructure environment based on the location information of the updated infrastructure environment; and
   distributing the deployment data to one or more computing devices.

2. The computer-implemented method of claim 1, wherein:
   parsing the environment repository occurs in response to detecting the update to the environment repository;
   generating the configuration data occurs in response to parsing the environment repository;
   generating the deployment data occurs in response to sending the configuration data; and
   distributing the deployment data occurs in response to generating the deployment data.

3. The computer-implemented method of claim 1, wherein:
   the service deployment management system is a cloud system, the cloud system communicatively coupled to the environment repository and the deployment repository via a cloud-based network, the method further comprising:
   receiving, at the environment repository, from the service deployment management system and via the cloud-based network, a request for the updated state;
   providing, to the service deployment management system, by the environment repository and via the cloud-based network, the updated state of the environment repository; and
   receiving, by the deployment repository, from the service deployment management system and via the cloud-based network, the configuration data, wherein distributing the deployment data to the one or more computing devices comprises sending the deployment data to the one or more computing devices from the deployment repository and via the cloud-based network.

4. The computer-implemented method of claim 1, wherein:
   the deployment data is secure deployment data, the secure deployment data generated based at least on the configuration data and security data, the secure deployment data further comprising a secure authentication dataset;
   the method further comprises sending, by at least one computing device of the one or more computing devices, a client authentication dataset; and
   distributing the deployment data to the one or more computing devices comprises providing the secure deployment data to the at least one computing device only if the client authentication dataset matches the secure authentication dataset.

5. The computer-implemented method of claim 1, further comprising:
   in response to detecting the update to the environment repository, sending, to at least a computing device of the one or more computing devices, an indication of the update to the environment repository; and
   wherein the update to the environment repository comprises an addition of a new infrastructure environment to the existing geographically distinct infrastructure environments and the indication indicates that the new infrastructure environment is added.

6. The computer-implemented method of claim 1, further comprising:
   in response to detecting the update to the environment repository, sending, to at least a computing device of the one or more computing devices, an indication of the update to the environment repository; and
   wherein the update to the environment repository comprises a deletion of an existing infrastructure environment from the existing geographically distinct infrastructure environments and the indication indicates that the existing infrastructure environment is deleted.

7. The computer-implemented method of claim 1, further comprising:
   deploying, by at least one computing device of the one or more computing devices, the service having the new configuration, the deploying of the service having the new configuration comprising causing executing of the service having the new configuration on the at least one infrastructure environment of the plurality of combined infrastructure environments.

8. The computer-implemented method of claim 7, further comprising:
   determining one or more new infrastructure environments on which the service having the new configuration is not currently executing; and
   wherein the at least one infrastructure environment of the plurality of combined infrastructure environments is selected from the one or more new infrastructure environments.

9. The computer-implemented method of claim 7, further comprising:
   selecting, by a user of the at least one computing device, one or more specified infrastructure environments; and
   wherein the at least one infrastructure environment of the plurality of combined infrastructure environments is selected from the one or more specified infrastructure environments.

10. The computer-implemented method of claim 7, wherein:
    the deployment data further comprises one or more updated parameters, the one or more updated parameters usable to execute the service having the new configuration on the plurality of combined infrastructure environments; and
    causing executing of the service having the new configuration comprises executing a subset of the one or more updated parameters to initialize the service having the new configuration on the at least one infrastructure environment.

11. A service deployment management system, comprising:
    one or more data processors; and
    a non-transitory computer-readable storage medium comprising instructions which, when executed by the one or more data processors, cause the one or more data processors to perform operations including:
       monitoring an environment repository, the environment repository comprising an existing state corresponding to one or more existing configurations for existing geographically distinct infrastructure environments comprising one or more devices on which a service having the one or more existing configurations is deployed;
       detecting an update to the environment repository, the update comprising an updated state, the updated state corresponding to a new configuration for an updated infrastructure environment that is different than the existing state for the one or more existing configurations for the existing geographically distinct infrastructure environments;
       in response to detecting the update to the environment repository, parsing, in sequence or in parallel, each state of the environment repository to determine one or more differences between the existing state and the updated state;
       generating, based on the determined one or more differences between the existing state and the updated state, configuration data, the configuration data used to synchronize a number of deployable services on a plurality of combined infrastructure environments, the plurality of combined infrastructure environments comprising at least the one or more existing configurations for the existing geographically distinct infrastructure environments and the new configuration for the updated infrastructure environment;
       sending the configuration data to a deployment repository;
       generating, based on the sent configuration data, deployment data, the deployment data utilizable by a computer to deploy the service having the new configuration on at least one infrastructure environment of the plurality of combined infrastructure environments, wherein:
          the deployment data comprises location information of the updated infrastructure environment, and
          the service having the new configuration is deployable on the at least one infrastructure environment based on the location information of the updated infrastructure environment; and
       distributing the deployment data to one or more computing devices.

12. The system of claim 11, wherein:
    parsing the environment repository occurs in response to detecting the update to the environment repository;
    generating the configuration data occurs in response to parsing the environment repository;
    generating the deployment data occurs in response to sending the configuration data; and distributing the deployment data occurs in response to generating the deployment data.

13. The system of claim 11, wherein:
    the service deployment management system is a cloud system, the cloud system communicatively coupled to the environment repository and the deployment repository via a cloud-based network, the non-transitory computer-readable storage medium further comprising instructions which, when executed by the one or more data processors, cause the one or more data processors to perform operations including:
    receiving, at the environment repository, from the service deployment management system and via the cloud-based network, a request for the updated state;
    providing, to the service deployment management system, by the environment repository and via the cloud-based network, the updated state of the environment repository; and
    receiving, by the deployment repository, from the service deployment management system and via the cloud-based network, the configuration data, wherein distributing the deployment data to the one or more computing devices comprises sending the deployment data to the one or more computing devices from the deployment repository and via the cloud-based network.

14. The system of claim 11, wherein:
    the deployment data is secure deployment data, the secure deployment data generated based at least on the configuration data and security data, the secure deployment data further comprising a secure authentication dataset;
    the non-transitory computer-readable storage medium further comprises instructions which, when executed by the one or more data processors, cause the one or more data processors to perform operations including sending, by at least one computing device of the one or more computing devices, a client authentication dataset; and
    distributing the deployment data to the one or more computing devices comprises providing the secure deployment data to the at least one computing device only if the client authentication dataset matches the secure authentication dataset.

15. The system of claim 11, the non-transitory computer-readable storage medium further comprising instructions which, when executed by the one or more data processors, cause the one or more data processors to perform operations including:
  in response to detecting the update to the environment repository, sending, to at least a computing device of the one or more computing devices, an indication of the update to the environment repository; and
  wherein the update to the environment repository comprises an addition of a new infrastructure environment to the existing geographically distinct infrastructure environments and the indication indicates that the new infrastructure environment is added.

16. The system of claim 11, the non-transitory computer-readable storage medium further comprising instructions which, when executed by the one or more data processors, cause the one or more data processors to perform operations including:
  in response to detecting the update to the environment repository, sending, to at least a computing device of the one or more computing devices, an indication of the update to the environment repository; and
  wherein the update to the environment repository comprises a deletion of an existing infrastructure environment from the existing geographically distinct infrastructure environments and the indication indicates that the existing infrastructure environment is deleted.

17. The system of claim 11, the non-transitory computer-readable storage medium further comprising instructions which, when executed by the one or more data processors, cause the one or more data processors to perform operations including:
  deploying, by at least one computing device of the one or more computing devices, the service having the new configuration, the deploying of the service having the new configuration comprising causing executing of the service having the new configuration on the at least one infrastructure environment of the plurality of combined infrastructure environments.

18. The system of claim 17, the non-transitory computer-readable storage medium further comprising instructions which, when executed by the one or more data processors, cause the one or more data processors to perform operations including:
  determining one or more new infrastructure environments on which the service having the new configuration is not currently executing; and
  wherein the at least one infrastructure environment of the plurality of combined infrastructure environments is selected from the one or more new infrastructure environments.

19. The system of claim 17, the non-transitory computer-readable storage medium further comprising instructions which, when executed by the one or more data processors, cause the one or more data processors to perform operations including:
  selecting, by a user of the at least one computing device, one or more specified infrastructure environments; and
  wherein the at least one infrastructure environment of the plurality of combined infrastructure environments is selected from the one or more specified infrastructure environments.

20. The system of claim 17, wherein:
  the deployment data further comprises one or more updated parameters, the one or more updated parameters usable to execute the service having the new configuration on the plurality of combined infrastructure environments; and
  causing executing of the service having the new configuration comprises executing a subset of the one or more updated parameters to initialize the service having the new configuration on the at least one infrastructure environment.

* * * * *